May 19, 1959 W. G. REININGER 2,887,586
X-RAY FOCUSING APPARATUS
Filed March 9, 1954 6 Sheets-Sheet 2

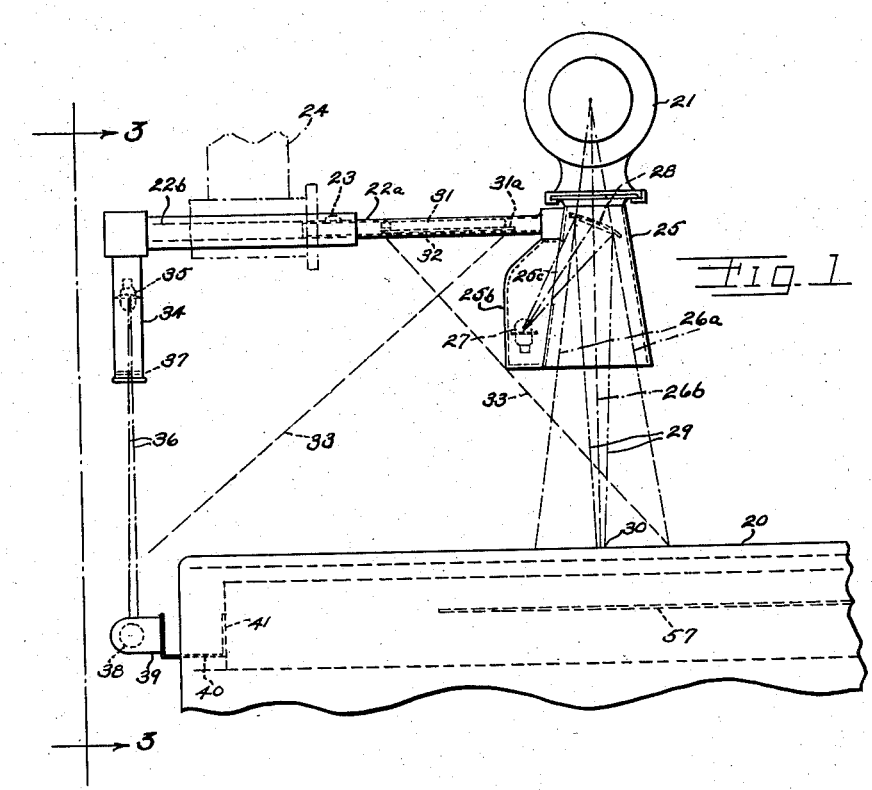

INVENTOR.
WALTER G. REININGER
BY
Hyde, Meyer, Baldwin & Doran
ATTORNEYS

May 19, 1959    W. G. REININGER    2,887,586
X-RAY FOCUSING APPARATUS
Filed March 9, 1954    6 Sheets-Sheet 3
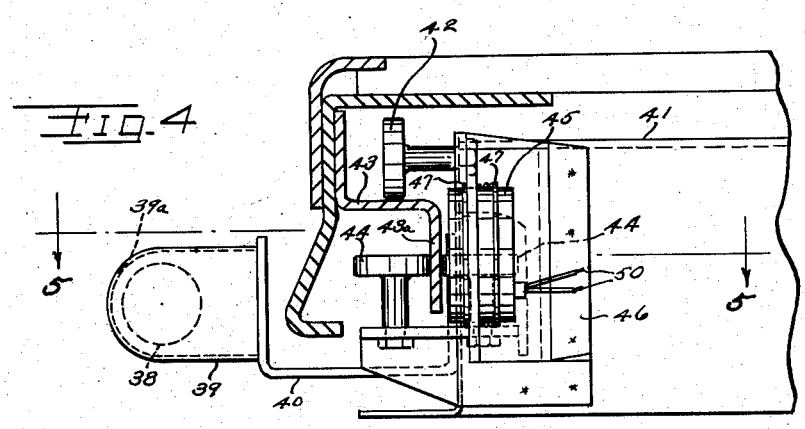
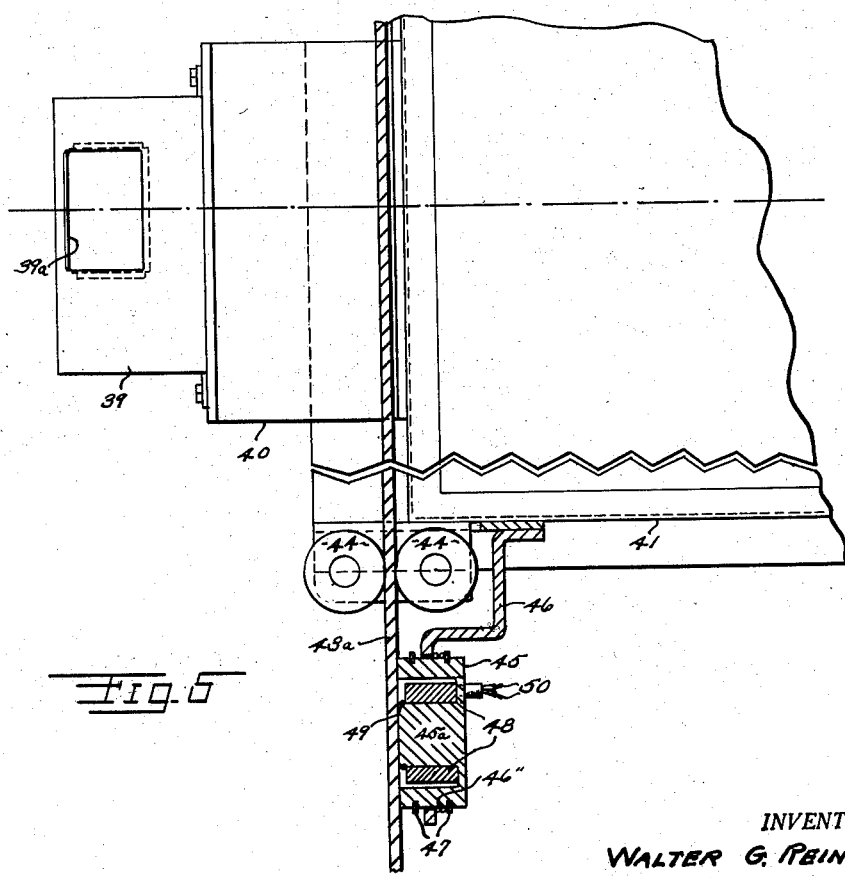
INVENTOR.
WALTER G. REININGER
BY
Hyde, Meyer, Baldwin & Doran
ATTORNEYS

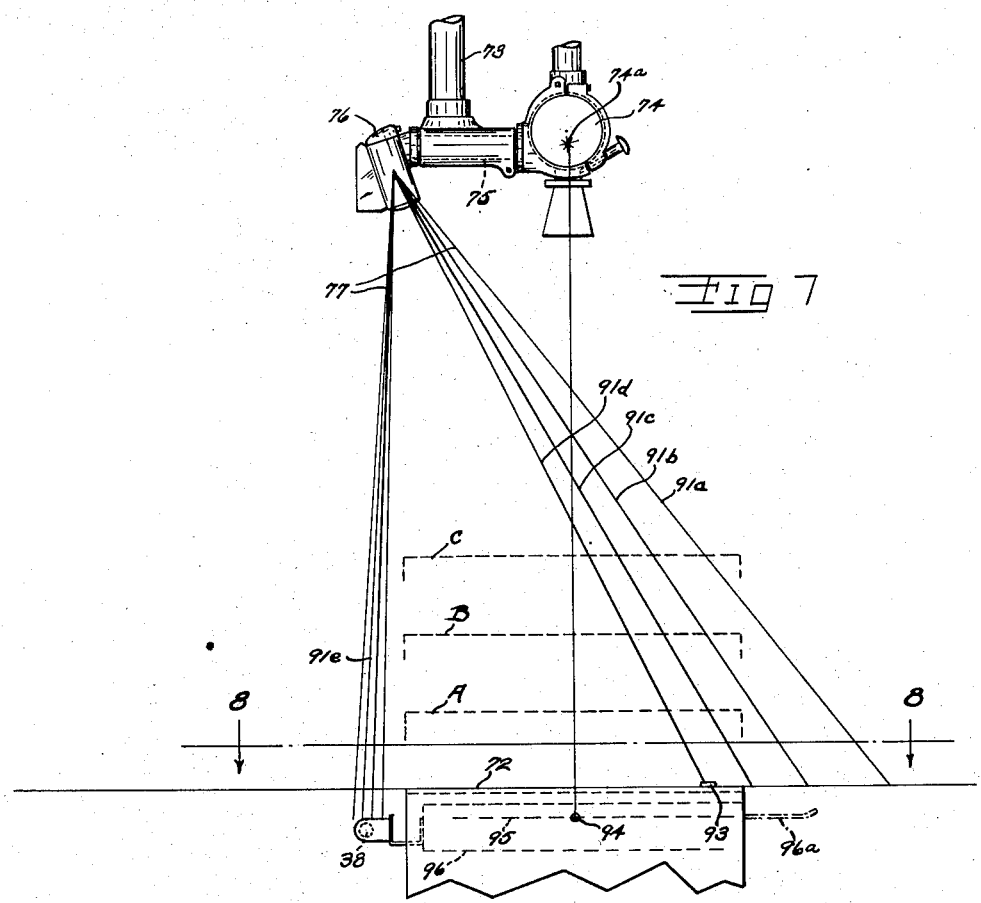
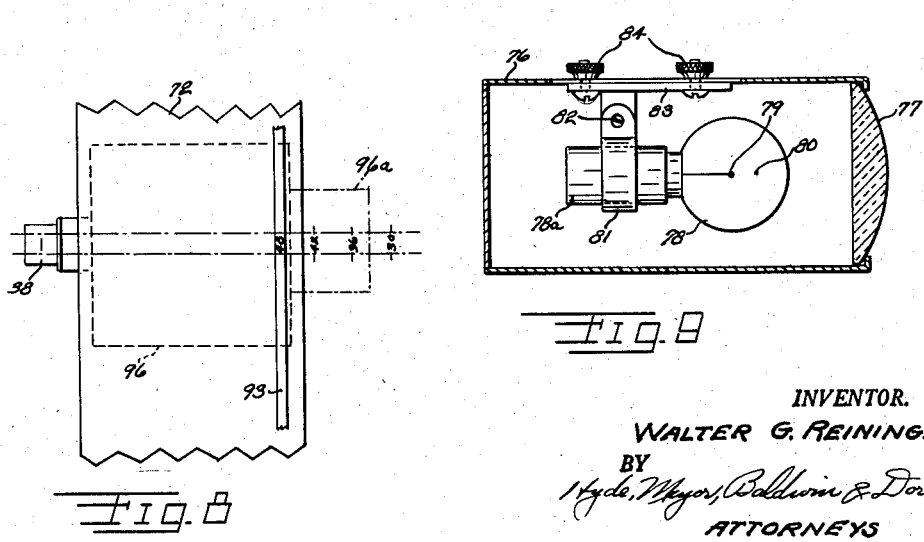

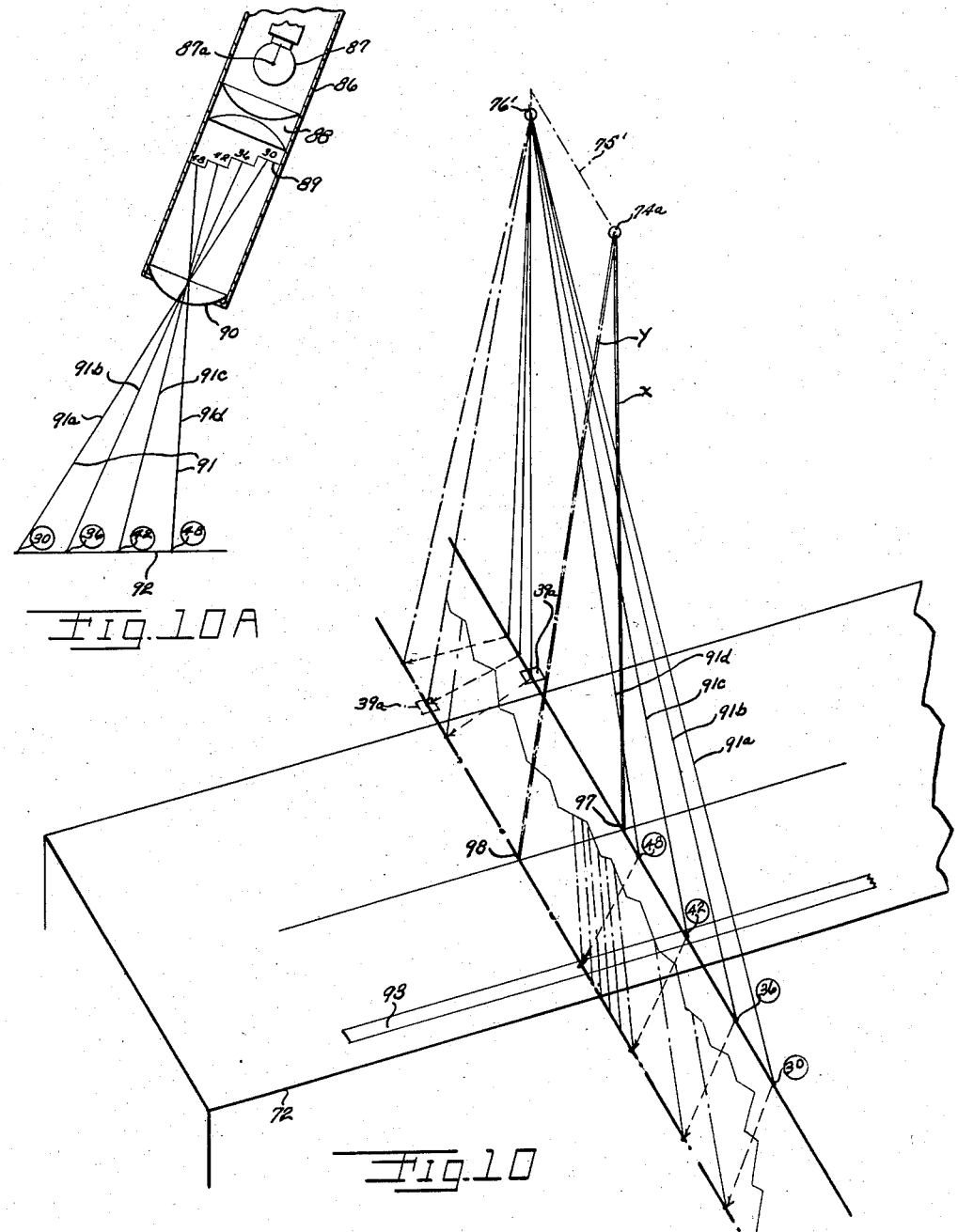

INVENTOR.
WALTER G. REININGER
BY
Hyde, Meyer, Baldwin & Doran
ATTORNEYS

United States Patent Office 2,887,586
Patented May 19, 1959

2,887,586
X-RAY FOCUSING APPARATUS

Walter G. Reininger, Cleveland Heights, Ohio, assignor to Picker X-Ray Corporation, Waite Manufacturing Division, Inc., Cleveland, Ohio, a corporation of Ohio Application March 9, 1954, Serial No. 414,940

4 Claims. (Cl. 250—59)

This invention relates to improvements in X-ray focusing apparatus.

One of the objects of the present invention is to provide a spot of visible light which is at all times centered with the axis of the primary X-ray beam.

Another object of the present invention is to provide two spots of light which at all times would be aligned on opposite sides of the central primary beam of the X-rays but which may become slightly separated from the actual axis of the primary X-rays at certain focal distances.

Another object of the present invention is to provide a narrow streak of visible light across an X-ray examining table or across a cassette changer which light will approximately pass through the principal axis of the primary X-rays.

Such a streak of light as defined in the preceding paragraph may be arranged to extend in front of the examining table in position to strike a Bucky cassette tray when it is pulled out.

Another object of the present invention is to provide visible light rays which at all times are projected from the level of the X-ray tube head in a plane which includes the principal axis of the primary X-rays, together with the utilization of this light to automatically lock a Bucky carriage when the principal axis of the primary X-rays strikes the film to be exposed in the Bucky. Such a light ray may be either a single beam or a line or fan of beams impinging upon a light sensitive device so as to automatically lock the Bucky carriage when the X-rays are properly focused on the center of the Bucky.

Another object of the present invention is to provide means for mounting an X-ray tube head opposite an examination surface in position to direct its primary rays toward said surface with means for varying the position of the head nearer to or farther from the examination surface, together with means movable with the head for directing light rays from the head toward the examination surface and with identifying numbers associated with the light rays and visibly produced at a predetermined spot on the examination surface so that the number visibly produced at said spot is correlated with the focal distance of the axis of the primary X-rays measured between the focal point of the X-ray tube head and the approximate position of the film in the Bucky carriage.

The invention also contemplates the combination of means for mounting an X-ray tube head opposite a generally planar examination surface and in position to direct its primary rays toward the surface, this mounting means including a pivot generally parallel to the surface so that the head is adjustable either toward and away from the surface or may be oscillated about the pivot so as to direct the X-rays at an angle toward said examination surface. Means is then provided movable with the head as it oscillates about this pivot for directing a generally planar fan of light rays toward the examination surface with the plane of the fan substantially passing through the axis of the primary X-rays. This will throw a fan of light across the object being examined or it may pass beyond the examination surface to indicate the center of a Bucky tray or of a cassette changer. The invention contemplates the provision of a plurality of identifying numbers associated with the fan, each number being projected along an imaginary rib of the fan and each number, when it appears at a predetermined spot associated with the examination surface, being correlated with the focal distance of the axis of the primary X-rays as measured between the focal point of the tube head and the general location of the film in the Bucky carriage.

Other objects and advantages of the present invention will appear from the accompanying drawings and description and the essential features thereof will be set forth in the appended claims.

In the drawings—

Fig. 1 is a fragmental end elevational view of an X-ray examination table showing an X-ray tube head mounted above the table and provided with some of the features of this invention;

Fig. 2 is a view similar to Fig. 1 showing a modification of the invention and showing a different arrangement for projecting visible light rays from the approximate level of the X-ray tube head toward the examination surface;

Fig. 2a is is a fragmental sectional view, enlarged, taken along the line 2a—2a of Fig. 2;

Fig. 4 is a fragmental sectional view enlarged taken along the line 4—4 of Fig. 3;

Fig. 5 is a transverse sectional view taken along the line 5—5 of Fig. 4;

Fig. 7 is an end elevational view of an X-ray examination table with an X-ray tube head mounted above it, this view being somewhat diagrammatic to illustrate the use of a fan of light rays for projecting numbers indicating focal distances;

Fig. 8 is a fragmentary top plan view taken along the line 8—8 of Fig. 7 and on a reduced scale;

Fig. 9 is a central sectional view through the visible light source of Fig. 7 and on an enlarged scale;

Figure 11:
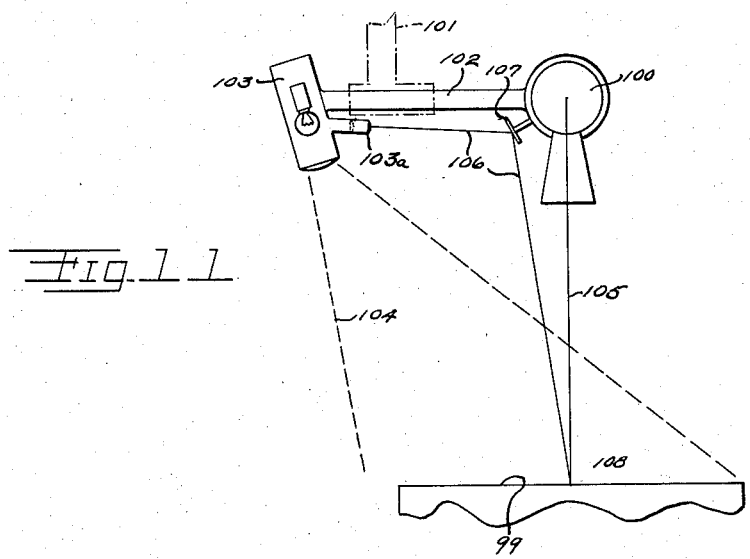
Figure 12:
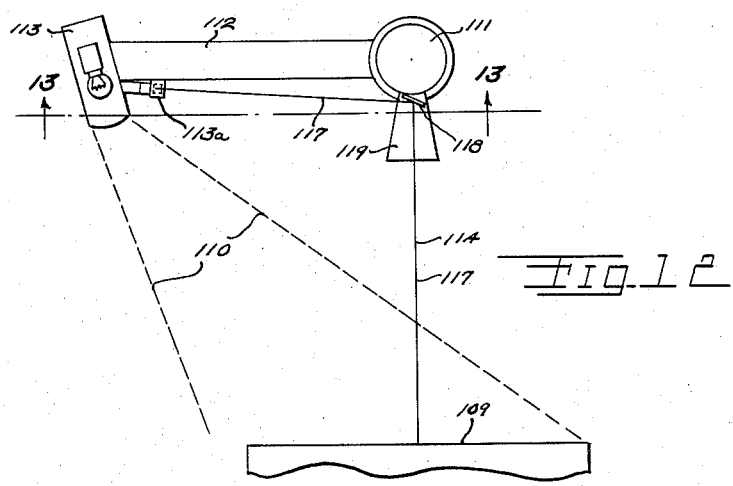
Figure 13:
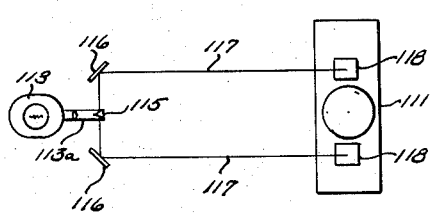

Fig. 10 is a diagrammatic view showing how a fan of visible light rays is projected toward an examination surface and indicating how an identifying number may appear at a certain predetermined spot on the examination surface to thereby indicate directly without calculation the focal distance of the principal axis of the primary X-rays as measured from the focal point of the tube head to a spot on or near the examination surface;

Fig. 10A is a diagrammatic view illustrating how a visible light source may be provided with a reticle for efficiently projecting a fan of visible light rays toward the examination surface;

Fig. 11 is a diagrammatic view illustrating the combination of a fan of visible light rays forming a thin streak of light passing through the principal axis of the primary X-rays, together with a spot of visible light adapted to coincide with and to indicate where the principal axis of the primary X-rays will strike the examination surface;

Fig. 12 is a diagrammatic view illustrating the combination of a fan of visible light rays projecting a thin streak of light across the examination surface and passing through the axis of the primary X-rays together with means for providing two spots of light aligned on opposite sides of the axis of the principal X-rays and at right angles to the streak of light; while Fig. 13 is a bottom plan view of the light ray projecting devices of Fig. 12.

Referring now to Fig. 1, an examination surface is shown at 20, the same being the narrower dimension of an elongated X-ray table. Above this table an X-ray tube head 21 is mounted on an arm portion 22a which moves telescopically in and out of the arm portion 22b, but these two arm portions are keyed together as indicated at 23 so that there is no relative rotation between the arm portions 22a and 22b. The arm portion 22b is mounted on a tube stand, a portion of which is shown in dot-dash lines at 24. The member 22b is rotatable about its own axis in the support 24. The support 24 is mounted either from the floor or ceiling so that the tube head 21 is movable vertically toward and away from the table surface 20 and is, of course, movable longitudinally of the examination surface 20. The arrangement is such, however, that a tilting of the X-ray tube head about the axis of the arm 22a, 22b causes all of the parts 21, 22a, 22b to rotate simultaneously about the axis of the arm 22a, 22b.

One of the inventions illustrated in Fig. 1 is the provision of means for projecting a visible light ray so as to strike the examination surface 20 coincident with the principal axis of the primary X-rays. The tube head is provided with a usual cone 25 and the cone of X-rays is indicated at 26a and their principal axis is indicated at 26b. On one side of the cone there is formed a closed pocket 25b having a single outlet opening 25c communicating with the hollow interior of the cone 25 and toward the narrower end of the cone. In the bottom of the pocket 25b there is mounted an electric light bulb 27 the rays from which are indicated in dash-dot-dot-dash lines in Fig. 1. A mirror or reflecting surface 28 is mounted in the cone in such a way as to receive the rays from the light 27 and to project the same downwardly toward the examination table surface as indicated by the lines 29. The reflective surface 28 is of a material permeable by the X-rays so that the mirror may be located crosswise of the cone of X-rays. The mirror is concave downwardly so as to focus the rays 29 substantially on a spot at 30 at the most generally used focal length. By this means a spot of light is projected at 30 on the examination surface 20 so as to indicate visibly the principal axis of the primary X-rays. This of course aids in focusing the X-rays on the object to be examined and to be photographed.

Another invention illustrated in Fig. 1 is means for projecting a fan of light rays from the level of the X-ray tube head toward the examination surface in a manner to project the thin streak of light rays crosswise of the examination surface in position to pass through the principal axis of the primary X-rays. The means shown in Fig. 1 comprises the mounting of an elongated electric light bulb 31 inside of the arm 22a which is made hollow for this purpose. Means not shown is provided for energizing the light bulbs 27 and 31. On the lower side of the arm portion 22a a narrow slit 32 is provided to allow the light rays to come through projecting a fan of light rays 33 in a thin narrow streak of light. A collimating lens (not shown) similar to 63a of Fig. 2a is provided parallel to light bulb 31. The slit 32 lies in a plane which also passes through the axis 26b of the primary X-rays so that the streak of light projected upon the examination surface 20 will pass through the principal axis of the primary X-rays whether or not the spot of light 30 is projected by the light 27 as previously described. The use of this visible streak of light passing through the principal axis of the primary X-rays helps of course in directing the X-rays in the proper position across the body to be subjected to the X-rays and the streak of light may extend beyond the front of the table as hereinafter explained in connection with Figs. 7 and 8 so as to fall across the tray of a Bucky cassette when the tray is pulled out beyond the front edge of the table as is quite common and as is indicated in dot-dash lines in Figs. 7 and 8. When this light streak cast by the fan 33 passes across the center of the Bucky tray or an indicated line thereon, the operator knows that the Bucky film is in the proper position to photograph the desired portion of the object subjected to the X-rays.

A further invention is disclosed in Fig. 1 and consists of light gun 34 mounted on the arm portion 22b above and slightly beyond the rear edge of the table surface 20. This gun 34 is rigid with the arm portion 22b so as to rotate with the arm portions 22a and 22b when the X-ray tube head is tilted. Within the gun a light bulb 35 is mounted and energized from a suitable source not shown. The light rays indicated in dot-dash lines at 36 pass downwardly generally at right angles to the axis of arm 22a, 22. Preferably, but not necessarily, a collimator is indicated at 37 for the purpose of holding the light rays to a narrow beam. As best seen in Figs. 1, 4 and 5, light ray sensitive means is provided at 38, mounted in a housing 39 which is rigidly connected by a bracket 40 with a Bucky carriage 41. This carriage is movable longitudinally of the table guided by a plurality of rollers 42 (Fig. 4) on a track portion 43 rigid with the table top. Other rollers 44 (Figs. 4 and 5) carried by the Bucky carriage engage opposite sides of a flange 43a on the track 43 so as to hold the carriage in position crosswise of the table. An armature 45 is held for slight movement toward and away from the flange 43a in a suitable opening in a bracket 46 which is rigidly attached to the Bucky carriage 41. Snap rings 47 on opposite sides of the bracket 46 limit the movement of the armature 45. An electrical winding 48 is wound around a central cylindrical core of the armature indicated at 45a so that this armature becomes an electromagnet. This winding is held in position by a ring 49. Two wires 50 lead out of the winding 48 for the purpose of energizing the same as will presently be described.

Figure 6:
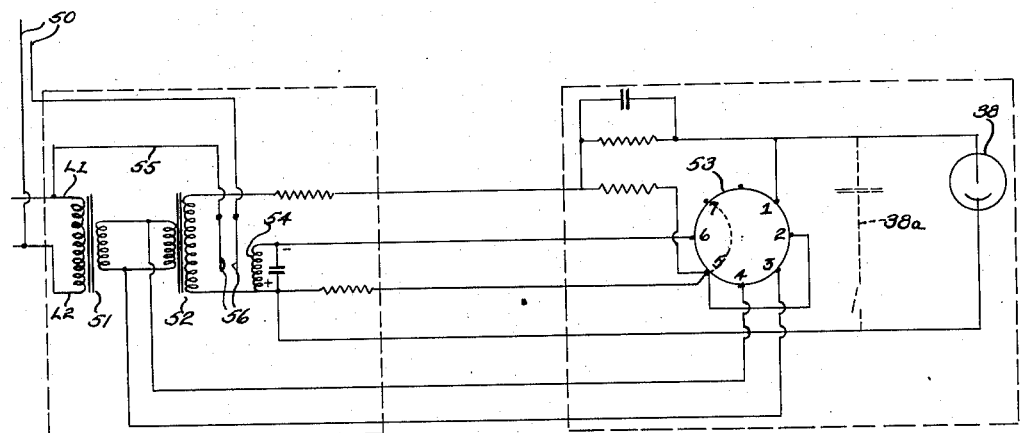
Fig. 6 is a diagrammatic view of electrical circuit for the operation of the magnetic locking device of Figs. 4 and 5.

Referring now to Fig. 6, the light sensitive tube 38 is shown diagrammatically. A source of power L1, L2, is connected through transformers 51 and 52 back to back so as to isolate this equipment from the main power supply. A standard space discharge tube of the Thyratron type is indicated at 53. This has the usual heater element, anode, cathode and control grid. The control grid is in circuit with the output from the light sensitive device 38 and the tube is of the known trigger tube type, normally nonconducting, but rendered conducting when it receives sufficient current from the light sensitive device 38. A control circuit is shown at 38a for regulating the sensitivity or light responsive characteristics of the tube 38 for generating current. When tube 53 is rendered conducting by light striking the device 38, relay winding 54 is energized so as to close a circuit from L1 through line 55, contacts 56, controlled by relay 54, and lines 50 through the winding 48 (not shown) and back to the source L2. This energization of the winding causes the electromagnetic armature 45, 45a to be attracted to the steel flange 43a of the track which is fixed to the X-ray table top. This locks the Bucky carriage to the table top at the time that the light rays 36 strike the light sensitive device 38. Obviously, if the fan of light 33 extends beyond the rear edge of the table surface 20, these light rays are also in position to strike the light sensitive device 38 so as to act through the circuitry of Fig. 6 to energize the winding 48 of the electromagnetic locking device. In either case, the operator knows that when he pushes the Bucky carriage 41 longitudinally of the examination table, when the carriage is locked in place through the mechanism just mentioned, then he is certain that the primary axis 26b of the X-rays is directed toward the approximate center of the film 57 in the Bucky carriage as the device 38 is so positioned to produce this result.

The modification shown in Figs. 2 and 2a is like that just described for the most part. The examination table top 20, Bucky carriage 41 with its film 57, light sensitive device 38, mounting bracket 40, are exactly the same. The tube head 58 is provided with a cone 59 directing X-rays toward the examination surface 20. The arm portion 60a is telescopically mounted in the portion 60b which in turn is rotatable about its own axis in a supporting arm 61 which as usual is arranged for movement of the tube head toward and away from the examination surface and longitudinally of the examination table. The key 62 prevents relative rotation between arm portions 60a and 60b while permitting telescoping movement of these parts relative to each other. In the arm portion 60a, which is hollow, is mounted an elongated electric light bulb 63 which casts its light rays through a narrow slit 64 through the lower wall of the hollow arm portion 60a. This slit casts a fan 65 of visible light rays toward the examination table which streak of light cast on the table top passes through the principal axis 66 of the primary X-rays. The lower portion of the arm 60b is hollow and an elongated light source 67 is mounted therein in position to cast visible light rays through a narrow slitted opening 68 in the bottom of the arm and in a plane which passes through the axis 66. A light collimating lens 63a is provided parallel to bulb 63 as shown in Fig. 2a and a similar lens (not shown) below light bulb 67. The narrow streak of light indicated at 69 passing downwardly through the opening 68 is in position above the light sensitive device 38 so that the light rays 69 may strike the device 38 and cause the locking action of the electromagnetic lock described in connection with Figs. 4, 5 and 6. The result of this device is like that described in connection with Fig. 1, namely, that the operator moves the Bucky carriage 41 until the light rays 69 fall upon the light sensitive device 38 in a manner to cause the locking of the electromagnetic lock so as to hold the Bucky carriage in a position where the primary X-rays will strike approximately the center of the film 57 in the Bucky cassette.

Figure 3:
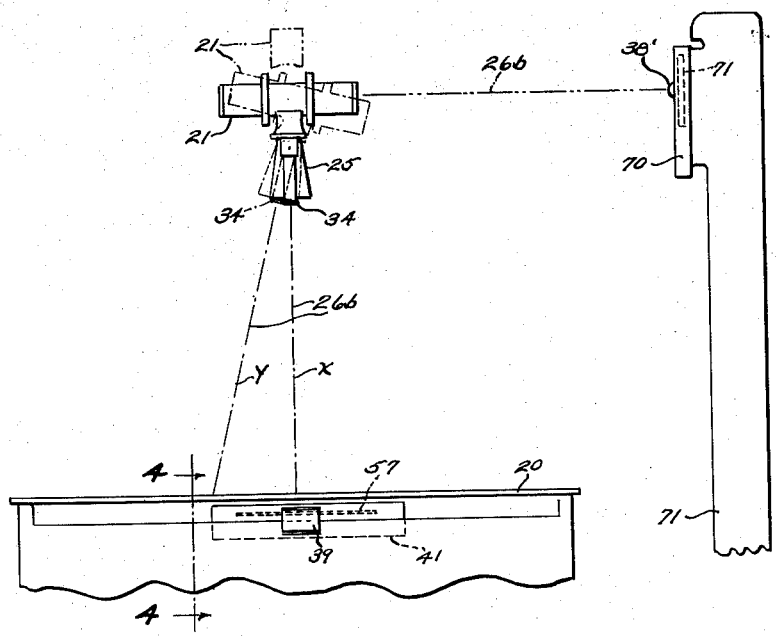
Fig. 3 is a side elevational view taken in the position of the line 3—3 of Fig. 1 but on a reduced scale and with certain parts omitted to illustrate the principle of this invention.

Fig. 3 is a somewhat diagrammatic representation of a side elevational view of the device of Fig. 1 on a reduced scale so as to illustrate how the X-ray tube head 21 may be tilted about the axis of the arm 22a, 22b to the dot-dash position of Fig. 3 so that the principal axis 26b of the X-rays may be changed from a position normal to the examination surface 20 to an angular position. This Fig. 3 also shows in dash-dot-dot-dash lines how the tube head 21 may be turned 90 degrees from the full line position so that the principal axis of the primary X-rays is directed horizontally toward a cassette changer 70 which is mounted on a stand 71 in the usual manner. In this case, a light sensitive device 38' similar in all respects to that described at 38 is mounted on the cassette changer in position to receive the light rays either from the light gun 34 or from the light source 31. The fan of light rays 33 is thus in a horizontal plane and will extend across the body of a patient standing in front of the cassette changer in the usual manner. This will indicate visually to the operator the position of the X-rays with respect to the body of the patient. The cassette changer is movable in the usual fashion and is provided with a magnetic lock (not shown) like that described at 45—48 and energized in a similar manner when light strikes the device 38' to lock the cassette changer in such a position that a film 71 is in the proper position to receive the primary X-rays and take a picture.

One of the objects of the present invention is to enable the operator to read the X-ray focal length directly without using any scales or tape measures. The exact knowledge of the distance focus to Bucky center is only important for techniques where the focus is in a perpendicular plane above the table center. This distance should be the focal distance which is indicated on the focused Bucky grid. In a focused Bucky grid, all of the lamellae are focused to a line in space above the center of the grid and parallel to the lamellae. Distorted shadows of the lamellae can be avoided only as long as the X-ray tube focus is somewhere on the above-defined focus line in space.

Techniques having the X-ray tube focus on points outside of the previously mentioned focus line, cannot use a focused Bucky grid. In these non-Bucky techniques, the distance from the X-ray tube focus to the center of the cassette is desirable to be known both for the exposure time and for avoiding resulting distortions in the picture obtained. However, in this case errors of plus or minus 20 percent in this focal distance cause irregularities which can hardly be seen on a film and the exact knowledge of this focal distance is not so important.

In Figs. 7 and 8 there is shown an arrangement for projecting a fan of light rays across an X-ray examination table top perpendicular to the longer axis of the table. Here the table is indicated at 72 with a tube stand at 73 supporting a tube head 74 above the table in the usual manner. The tube head is tiltable about the axis of an arm 75 extending crosswise of the table. Rigid with this arm is a visible light ray projecting device 76 which projects a fan of visible light rays 77 toward the table top.

One manner of forming the light gun 76 is shown in Fig. 9. The gun is designed with a convex cylindrical lens 77 (shown in full lines) and a lamp 78 having an elongated straight line filament 79 close to the focal axis 80 of the lens 77. In this way, all of the light emitted from the filament in the direction of the lens is used to form a light streak on the other side of the lens. A cylindrical lens alone may be used as shown in Fig. 9, or a spherical condenser making a small picture of the filament may be utilized, together with a cylindrical lens like that shown at 77 located in the same relationship to the small picture of the filament as the relationship between the lens 77 and filament 79 shown in Fig. 9. The filament 79 is linear with its axis parallel to the focal line 80 of the cylindrical lens 77 in order to have the light streak as concentrated as possible. In order to set the filament at the right focal distance, the lamp 78 is mounted in a bracket 81 which is pivotally mounted at 82 in another bracket 83 which is adjustable longitudinally of the light gun by means of knurled thumb screws 84. Setting the filament 79 parallel to the focal line 80 is done by rotating the lamp socket 78a in the bracket 81.

With the above description of one type of gun, one may compare another type of gun shown in Fig. 10a. Here the housing 86 is fitted with a lamp 87 which may be mounted for adjustment as described in connection with Fig. 9 but this adjustment is omitted from Fig. 10a for purposes of simplicity. The lamp 87 has a filament 87a forming substantially a point source of light. A condenser lens 88 is provided between the lamp and a reticle 89 which is of stepped construction as shown in Fig. 10a. The number above each step is etched or pointed on its associated step. The light rays are projected from the reticle through the objective lens 90 so as to project a fan of rays 91, the imaginary ribs of which will carry projected numbers which may be read upon the surface on which the rays impinge as indicated at 92. For instance, the imaginary rib 91a is shown as carrying the number 30 and ribs 91b, 91c and 91d are shown respectively as projecting the numbers 36, 42 and 48. The steps in reticle 89 are made in order to have sharp focused pictures of the numbers at the distances indicated, 30 inches, 36 inches, etc. Instead of steps, the reticle may be mounted on an inclined wedge to provide the proper reticle-to-lens distances for focusing the numbers on surface 92.

Referring back to Fig. 7, and using the nomenclature of Fig. 10a, the imaginary ribs are shown at 91a, 91b, 91c and 91d as projecting the numbers 30, 36, 42 and 48 respectively as just described. It will be noted that the longest rib carries the lowest number. The result of this arrangement is illustrated diagrammatically in Fig.

7 where the change of the relationship between the tube head 74 and the table top 72 has been shown not by moving the tube head (as in actual practice) but rather by indicating different positions of the table top 72 as in the full line position and positions A, B and C as the focal distance becomes shorter. If one picks the predetermined spot on the table top as the strip 93 placed along the table top parallel to the front edge thereof and near the front edge, one will see that the imaginary rib 91d projects the number 48 on the strip 93 which is coordinated with the focal distance from the focus 74a of the tube to the point 94 on the film 95 in the Bucky carriage 96. Normally, the point 94 is about two inches below the top of table 72 but these calibrations are made so that the number 48 will appear at the point 93 when the focal distance to the point 94 is actually approximately 48 inches.

When the focal length is shortened from the full line position of Fig. 7 by moving the support 73 so as to shorten the distance between the tube head and the table top, when the position A is reached, then the imaginary rib 91c projects the number 42 at the spot 93 indicating that the focal length at that position between points 74a and 94 is approximately 42 inches. Likewise, when the focal distance is shortened so that the relative position of the table top is indicated at B, then the rib 91b projects the number 36 at the spot 93. When the focus is still further shortened to the position C of Fig. 7, then the imaginary rib 91a of the fan of light projects the number 30 at the spot 93. In all of these cases with the table top as indicated at full lines in Fig. 7 and then progressively at the levels A, B and C each number is projected along an imaginary rib of the light fan, each of said ribs being the hypotenuse of a right triangle, the altitude of which is correlated with the focal distance of the axis of the primary X-rays with reference to the examination surface (or the center of the Bucky a fixed distance below it) and the bases of all of said right triangles is approximately the same, so that the true focal distance may be read directly by the number projected at a predetermined spot correlated with the examination surface when the parts are properly calibrated making the allowance as indicated above.

It is obvious that the predetermined spot upon which the numbers 30, 36, 42 and 48 are projected might be the casette tray 96a shown withdrawn from the cassette in the Bucky carriage 96 to the dot-dash position of Fig. 7 forwardly of the front edge of the examination table. In this case, the level of the surface on which the numbers is projected would be almost at the level of the film in the Bucky carriage and the allowance of the approximate two inches distance between the surfaces 72 and 94, previously mentioned, would not have to be taken into account in calibrating the numbers with level of the projecting surface.

In Fig. 7 I have also shown how part of the fan of light rays at 91e may fall on a light sensitive device 38 so as to lock the Bucky carriage by an electromagnetic device as described in connection with Figs. 4 and 5.

In Fig. 10, I have tried to show diagrammatically how the light gun of Fig. 9 or of Fig. 10a may be utilized to read the focal length directly when the X-ray tube head is tilted as illustrated in Fig. 3 from the position where the principal axis of the primary X-rays is at right angles to the table top as indicated at X to the position Y at an angle to the table top. Here the position of the beams X and Y are indicated utilizing the table top 72 and the strip 93 of Fig. 7. The arm 75 of Fig. 7 is indicated by the dot-dash line 75' of Fig. 10. The source of the light rays of the light gun 76 of Fig. 7 is indicated 76' in Fig. 10. The fan of light rays shown in full lines (with the plane of the fan at right angles to the planar table top 72) is taken at such a focal length that the number 42 is projected by the imaginary rib 91b on the strip 93. Keeping the arm 75 at the same height above the table top, the tube head is tilted to the angle represented between the axes X and Y. Now the distance from the point 74a to the point 98 is of course longer than the distance from the point 74a to the point 97. It is assumed, therefore, that the number 48 projected by the imaginary rib 91d of the light fan will now fall upon the strip 93 indicating that the actual focal distance from the tube focus to the Bucky center is now 48 inches in the tilted position of the X-ray tube head.

The light fan described in connection with Figs. 7 and 10 for projecting numbers along imaginary ribs of the fan would not operate correctly if the X-ray tube were tilted in a plane crosswise of the table top, or at right angles to the tilt from position X to the position Y illustrated in Fig. 3. The light fan would also show incorrect figures if the X-ray tube were not in a plane perpendicular to the table top center line or at least a plane fixed with reference to the indicating surface such as 93.

In Fig. 11 there is shown somewhat diagrammatically a table top 99, an X-ray tube head 100 mounted above that table top by means of a tube stand 101 in which is oscillatably mounted an arm 102 which is rigidly connected with the tube head 100 and with a light gun 103. The light gun 103 projects a fan of visible light 104 which is substantially planar which plane includes the principal axis 105 of the primary X-rays from the head 100. The fan 104 projects a thin streak of light across the table or across the body of a patient on the table. An auxiliary light outlet 103a projects a single beam of light 106 to a mirror 107 fixed with respect to the tube head and arm 102. The mirror is so arranged that the beam 106 strikes the table top at the spot 108 where the principal axis 105 strikes the table top at the preferred working focal distance of the head above the table top. This puts a spot of light on the streak cast by the fan 104 so as to clearly indicate the principal axis of the primary X-rays on the examination table 99.

In Figs. 12 and 13 there is shown an arrangement similar to that of Fig. 11 except that two spots of light are projected on the table top 109, these spots being on opposite sides of the streak of light cast by the fan of visible light 110, these spots normally being on a line at right angles to the streak of light cast by the fan 110. Here the X-ray tube head 111 is mounted above the table top 109 by any suitable means not shown. The arm 112 rigidly connects the hand with the light gun 113. This gun casts the planar fan of light rays 110 in a plane which passes through the axis 114 which is the principal axis of the primary X-rays at right angles to the table top 109. An auxiliary light gun 113a is provided with a prism 115 with mirror surfaces splitting the beam 117 as shown, and a pair of mirrors 116 so arranged that two parallel beams of visible light 117 are projected away from the light gun to strike mirrors 118 which are fixed on the X-ray tube head on opposite sides of the cone 119. The two beams of light travel downward from the mirrors 118 to the table top 109 in the same plane with the principal axis 114 but on opposite sides of the axis. Preferably, the two beams 117 would be arranged to intercept the axis 114 of the primary X-ray beam at the optimum or usual focal distance. As this focal distance were increased or decreased, the spots from the beams 117 would appear on opposite sides of the streak of light cast by the fan 110 and would serve to indicate accurately the position of the axis of the primary beam on the light streak extending across the table.

In the specification and claims wherever the terms "light sensitive means," "light rays," and similar terms using the word "light" are used, they are intended to include infrared or invisible light rays and means sensitive to such rays where the function could be performed by such rays as in locking the Bucky carriage to the examination table.

What I claim is:

1. In combination, X-ray tube head means, means for mounting said head spaced from a working surface for movement along an axis extending across said surface and generally parallel to said surface and for tilting about said axis in position to emit rays toward said working surface, and linear light source means on one of said means generally parallel to said axis and tiltable with said head means and directing a generally planar fan of light rays with the plane of said fan substantially passing through the principal axis of the primary X-rays whereby to impinge with substantially a line of light across substantially the full width of said working surface, an X-ray-sensitive device movable along said working surface in a path generally at right angles to the tilting axis of said head means, locking means engageable between said device and said surface to lock said device against movement relative to said surface, light-sensitive means operatively connected with locking means for causing locking actuation of the latter, and said line of light extending beyond said surface in a position adapted to strike said light sensitive means when said primary X-rays are directed toward said device.

2. In combination, X-ray tube head means, means for mounting said head spaced from a working surface for movement along an axis extending across said surface and generally parallel to said surface and for tilting about said axis in position to emit rays toward said working surface, linear light source means on one of said means generally parallel to said axis and tiltable with said head means and directing a generally planar fan of light rays with the plane of said fan substantially passing through the principal axis of the primary X-rays whereby to impinge with substantially a line of light across substantially the full width of said working surface, a cassette carriage movable beneath said working surface and having a tray movable in said carriage to a position laterally to one side of said surface, and said line of light extending beyond said surface and onto said tray, whereby in any working position of said X-ray tube head means relative to a patient on said surface, said line of light will aid in aligning said tray with the part of said patient to be photographed.

3. In combination, an examination surface, means mounting an X-ray tube head opposite said surface in position to direct its primary X-rays toward said surface, an X-ray sensitive device movable along said surface in a path, means mounting said head for oscillation about a pivotal axis crosswise of said path, means oscillatable with said head for directing visible light rays away from said head toward said surface in a definite pattern, said X-ray-sensitive device being a cassette carriage, locking means engageable between said device and said surface to lock said device against movement relative to said surface, light-sensitive means operatively connected with said locking means for causing locking actuation of the latter, and said pattern including a light ray adapted to strike said light-sensitive means when said primary X-rays are directed toward said cassette.

4. In combination, a generally planar examination surface, means mounting an X-ray tube head opposite said surface in position to direct its primary rays toward said surface, said means including an arm movable toward and away from said surface in a plane generally normal to said surface, said head and arm being oscillatable as a unit in said mounting means about a pivotal axis substantially parallel to said surface, means on and movable with said arm for directing a generally planar fan of light rays toward said surface with the plane of said fan substantially passing through the axis of the primary X-rays, and a plurality of identifying numbers associated with said fan, each number projected along an imaginary rib of said fan, each of said ribs being the hypotenuse of a right triangle, the altitude of which is correlated with the focal distance of the axis of said primary X-rays with reference to said surface and the bases of all of said right triangles being approximately the same, whereby the said focal distance may be read directly by the number projected at a predetermined line on said surface at right angles to a line projected by said fan on said surface.

References Cited in the file of this patent

UNITED STATES PATENTS

| | | |
|---|---|---|
| 2,120,729 | Chausse | June 14, 1938 |
| 2,486,503 | Stephens | Nov. 1, 1949 |
| 2,529,054 | Smith | Nov. 7, 1950 |
| 2,623,180 | Zurli et al. | Dec. 23, 1952 |
| 2,659,824 | Burnham | Nov. 17, 1953 |